United States Patent

[11] 3,593,331

[72] Inventors Kenneth P. Connell
Los Angeles;
Joseph J. Bourdon, Inglewood, both of, Calif.
[21] Appl. No. 795,416
[22] Filed Jan. 31, 1969
[45] Patented July 13, 1971
[73] Assignee The National Cash Resister Company
Dayton, Ohio

[54] MAGNETIC DISC CALIBRATION TRACK WITH DIMINISHING APERTURES
13 Claims, 7 Drawing Figs.

[52] U.S. Cl. .......... 340/174.1 C
[51] Int. Cl. .......... G11b 5/56
[50] Field of Search .......... 340/174.1 B, 174.1 C; 179/100.2 S, 100.2 A; 274/41.4

[56] References Cited
UNITED STATES PATENTS

| | | | |
|---|---|---|---|
| 3,251,054 | 5/1966 | Simon .......... | 340/174.1 |
| 3,258,750 | 6/1966 | Shew .......... | 340/174.1 |
| 3,423,743 | 1/1969 | Silverman .......... | 340/174.1 |
| 3,479,664 | 11/1969 | Stuarr-Williams et al. .... | 340/174.1 |

*Primary Examiner*—Stanley M. Urynowicz, Jr
*Assistant Examiner*—Vincent P. Canney
*Attorneys*—Louis A. Kline, John T. Matlago and Milton E. Kleinman ABSTRACT: Apparatus used to align a multiple head unit mounted in a disc file of a magnetic disc memory system. The multiple head unit supports a plurality of magnetic read/write heads in close proximity to a surface of an interchangeable record disc having a magnetic recording surface on a nonmagnetic substrate. A calibration track pattern is formed on the record disc for each read-head by exposing defined areas of the nonmagnetic substrate through the magnetic recording surface. The track patterns are rotated on the record disc surface past their respective read-heads. The accurately positioned calibration track patterns are disposed on the record disc to provide signals from the read-heads indicative of the amount and direction of displacement of each read-head relative to its respective rotating calibration track pattern. An adjustment is provided for the multiple head unit to reduce the maximum displacement between the read/write heads and their respective calibration track patterns.

INVENTORS
KENNETH P. CONNELL
JOSEPH J. BOURDON

INVENTORS
KENNETH P. CONNELL
JOSEPH J. BOURDON

BY John T. Matlago
Milton E. Kleinman
THEIR ATTORNEYS

INVENTORS
KENNETH P. CONNELL
JOSEPH J. BOURDON

Louis A. Kline
BY John T. Matlago
Milton E. Kleinman
THEIR ATTORNEYS

INVENTORS
KENNETH P. CONNELL
JOSEPH J. BOURDON

Louis A. Kline
BY John J. Matlago
Milton E. Kleinman
THEIR ATTORNEYS

MAGNETIC DISC CALIBRATION TRACK WITH DIMINISHING APERTURES

This invention relates to magnetic disc memory systems employing disc files with interchangeable record discs and more particularly to apparatus used to align a group of read/write heads mounted on an adjustable multiple head unit in a disc file.

Disc memory systems, commonly employed in data processing systems for storing information, often include an assembly of one or more magnetic record discs adapted to be mounted on a drive unit for recording data on the surfaces of the disc and then reading and updating such data as desired. The magnetic coded record discs provide a large memory that is randomly accessible when in use and that has off-line storage capability. The assembly of record discs, a disc stack, is retained in the disc memory system for its read/write activity and then replaced and put in off-line storage while another disc stack is similarly used. Information is stored in a magnetic surface coating of each record disc on a plurality of closely spaced circular tracks. The radial location of these tracks is determined by the radial position of the read and write heads, which are physically fixed to each other, relative to the rotating record disc. Since the read-head is positioned at the same radial distance as a corresponding write-head, it follows that in a particular disc memory system, any data that has been written on a particular track of a record disc can readily be located and read from the record disc. Furthermore, the fixed physical relationship of the read-heads to the write-heads enable data that is written on a particular track of a record disc, which is subsequently stored off-line for a period of time and then replaced in the same disc memory system, to be readily located and the stored data is easily read or altered, as desired.

With the increasing use of digital computers for processing data there has evolved data processing centers wherein a number of computers, with separately connected disc memory systems, may be independently operated. In order to provide an efficient utilization of computer equipment and to facilitate the scheduling of processing tasks at these processing centers, it is desirable that disc stacks containing large amounts of information be interchangeably used with any disc memory system. In this manner, a single disc stack, having the capability of storing millions of information bytes, could be readily converted to online storage for any one of the computers at the data processing center or, indeed, it could even provide for transferring large blocks of information in a readily usable form between geographically separated processing centers. However, in order to obtain clear and unambiguous readout signals, it is necessary that the read/write heads in different disc memory systems be precisely located with relation to the extremely narrow tracks on the record disc since the strength of the recorded signals rapidly falls off to both sides of a center track position. Accordingly, it is readily appreciated that any disparity between the radial position of corresponding read/write heads in different disc memory systems would adversely effect the interchangeability of disc stack, containing magnetic coded binary information in closely spaced circular tracks.

The present invention provides for an adjustment standard that is not subject to drift or inadvertent changes and that may be used to precisely adjust corresponding read/write heads of different disc memory systems to a common radial position, thereby insuring the interchangeability of disc stacks between different disc memory systems. Furthermore, this adjustment and the subsequent verification of this adjustment does not require a manual dimensional measurement, which is difficult to accurately obtain, of the read/write heads radial position in the disc file, but rather the adjustment is made and verified in accordance with an easily recognizable pattern of electrical signals obtained from the read-head. Another feature of this invention is that it provides for obtaining a radial setting for a group of read/write heads commonly mounted in a movable head unit that is optimized by positioning the head unit relative to a plurality of tracks on the disc record so as to reduce the maximum displacement between the read/write heads and their respective tracks. In addition, the calibration equipment required to perform this sensitive adjustment may be treated in the same manner, and made subject to the same handling, as other equipment commonly used with the disc memory system. In the described disc file, this is achieved by utilizing a removable disc stack with a precisely positioned calibration pattern etched on its magnetic surfaces to ascertain the precise radial position of each of the read/write heads mounted in a movable head unit and to thereby obtain an optimized adjustment of the movable head unit with respect to the calibration tracks on the record disc.

In accordance with the features of this invention, which provides a solution to the aforementioned problem, the disc memory system includes a multiple head assembly with radially adjusted read/write heads and a removable disc stack with a calibration pattern formed on a record disc by etching away areas of the magnetic surface to expose a nonmagnetic substrate. The magnetized record disc is rotated past the transducer head, which senses the absence of magnetization as an exposed nonmagnetic substrate area passes beneath the transducer head. The calibration pattern is formed so as to produce easily distinguishable readout patterns from the transducer heads which are indicative of the radial position of the transducer head relative to a predetermined radial position of the calibration pattern etched on the record disc.

Accordingly, one of the objects of this invention is to provide improved disc memory systems with interchangeable disc stacks having the foregoing features and advantages. Other objects and features of the invention will become apparent to those skilled in the art as the disclosure is made in the following detailed description of a preferred embodiment of the present invention as illustrated in the accompanying sheets of drawings, in which.

Figures 1, 3, 4:
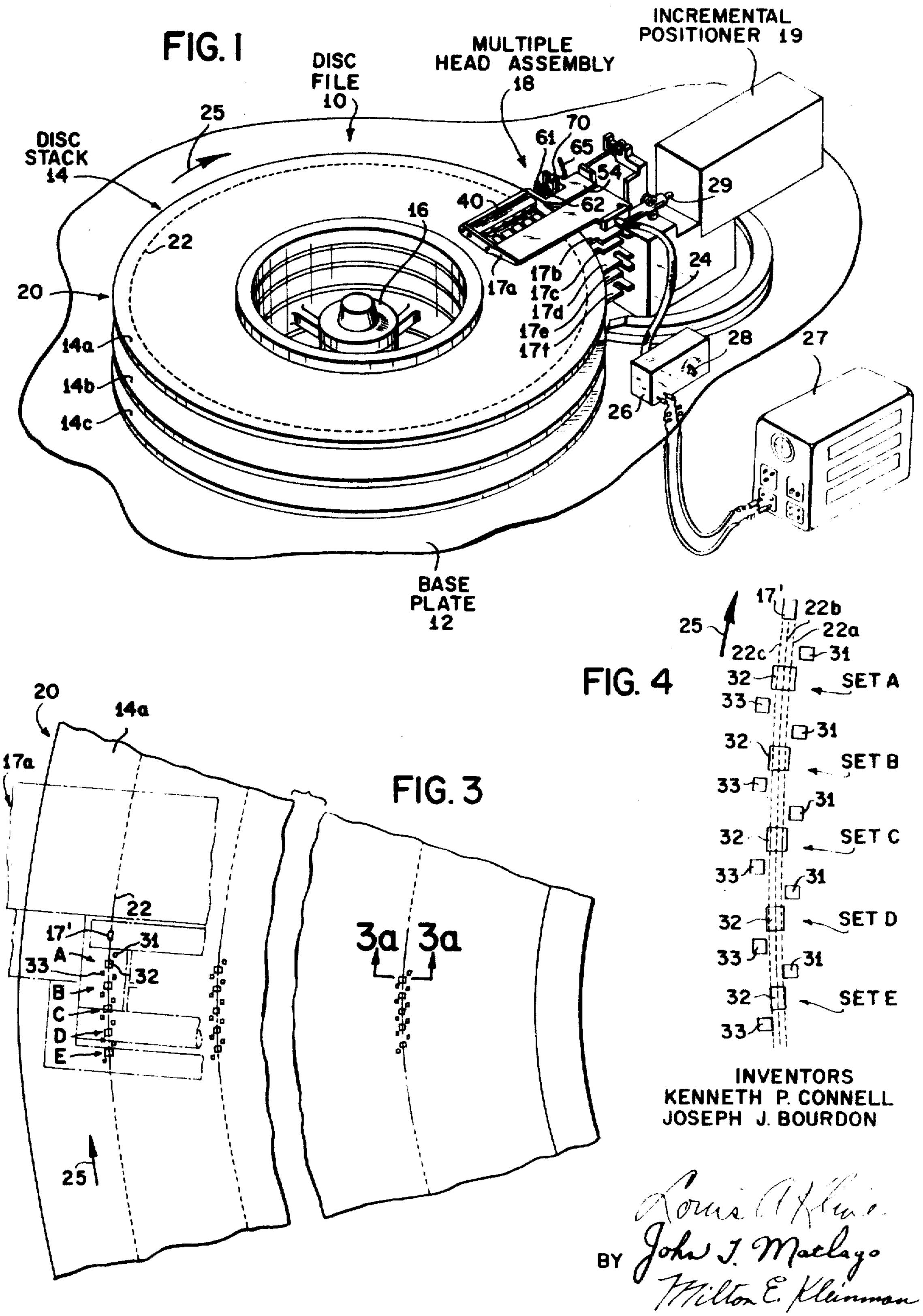
FIG. 1 is a pictorial view showing certain mechanical details of a disc file with an interchangeable disc stack including a plurality of record discs.
FIG. 3 is a detailed view of a portion of the record disc shown in FIG. 1 and illustrates the calibration pattern etched on the record disc.
Figure 3A:
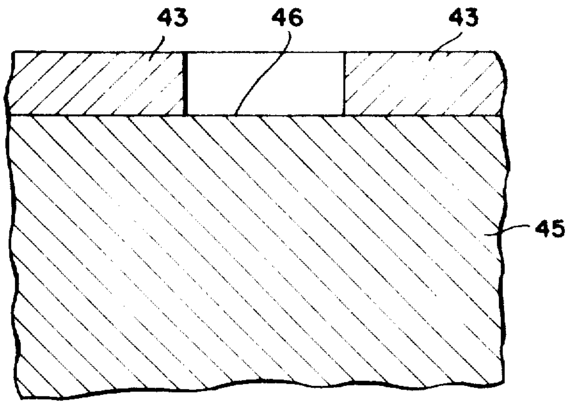

FIG. 3*a* is an enlarged sectional view of a portion of the record disc shown in FIG. 3, taken along line 3*a*–3*a*, to show a typical aperture formed by removing an area of the magnetic recording medium to expose a surface of the nonmagnetic substrate.

Figure 5:
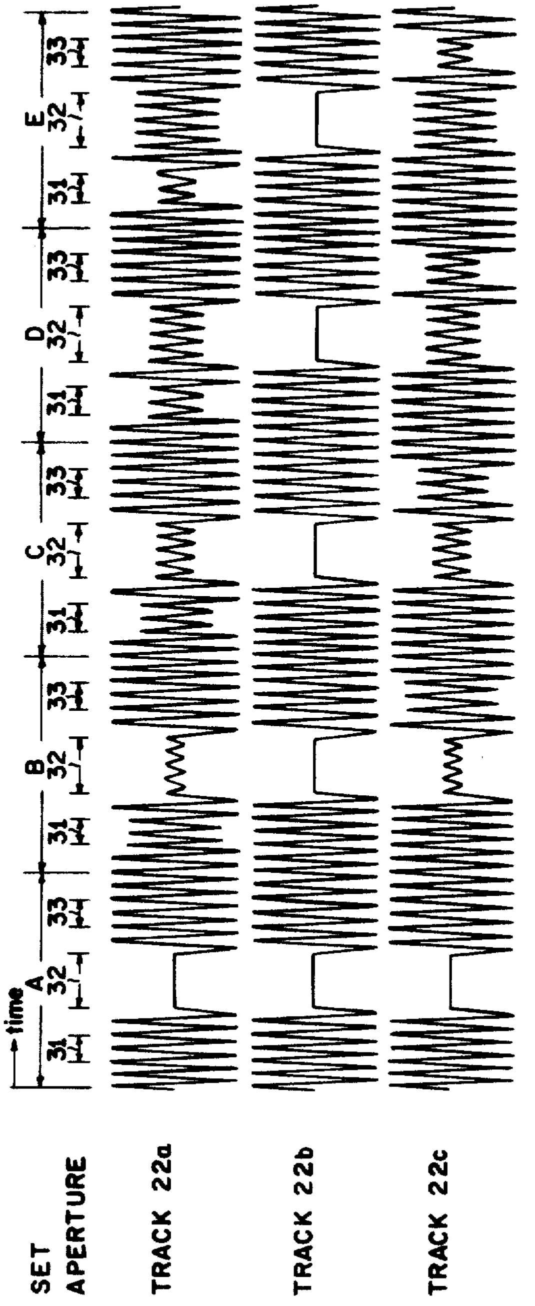
Figure 6:
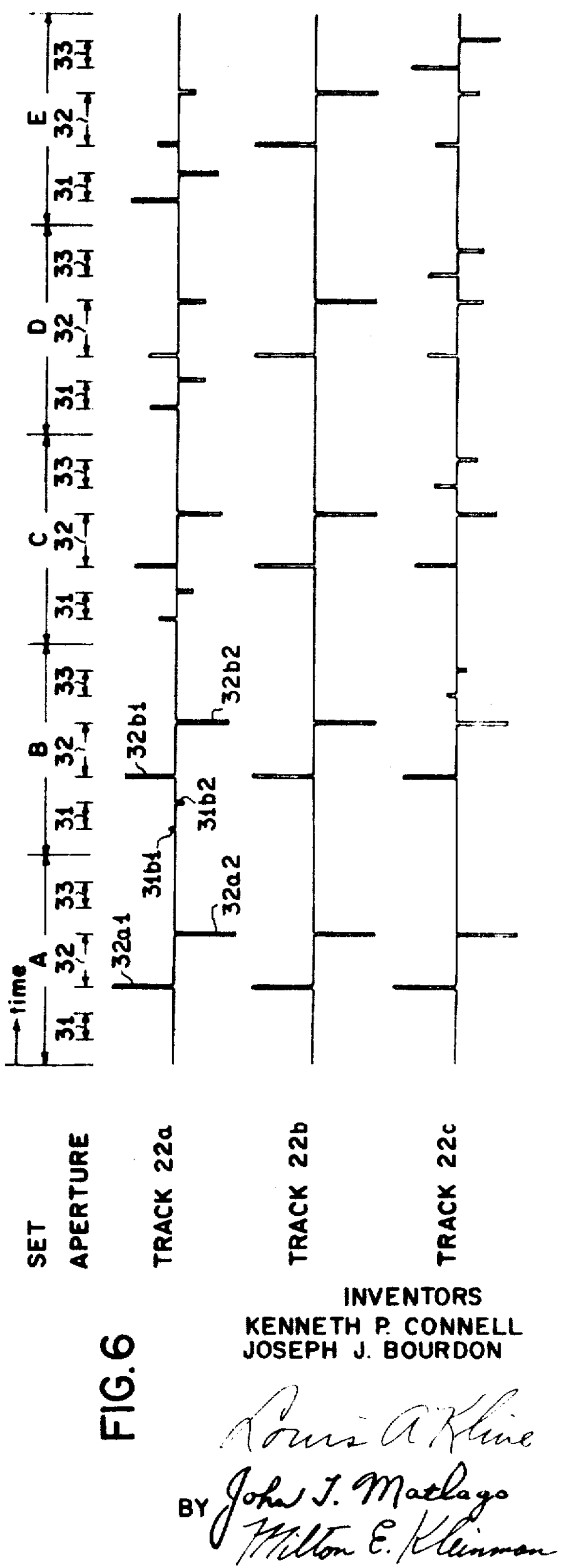

FIG. 4 is an enlarged illustration of a calibration track pattern which is that portion of the calibration pattern etched on the record disc shown in FIG. 3 that is associated with a single read/write head;

FIG. 5 illustrates the sequence of signals obtained in accordance with the described use of the calibration pattern shown in FIGS. 3 and 4; and FIG. 6 illustrates an alternate set of signals that may be obtained with the described use of the calibration shown in FIGS. 3 and 4.

FIG. 1 illustrates a disc file apparatus 10, such as used in disc storage systems disclosed, for example, in the commonly assigned copending U.S. application of Edward P. Bucklin, Jr. et al., Ser. No. 648,496 now abandoned. The disc file apparatus in general is comprised of a disc stack 14, including three record discs **14*a*, 14*b*, 14*c*, rotatably mounted on a baseplate 12 and in close proximity to a multiple head assembly 18. The record discs 14*a*, 14*b*, 14*c*, commonly secured to one another are removed as a unit for interchanging the disc stack 14 in the disc file. The disc stack 14 is mounted on an axial spindle 16 and rotatably driven on the spindle 16 by a suitable means (not shown) in the direction indicated by a rotation arrow 25. Each of the three record discs 14*a*, 14*b*, 14*c* provides upper and lower magnetic recording surfaces for cooperating with respective ones of multiple head units 17***a* to 17*f* of the multiple head assembly 18. The head assembly 18 is pivotably mounted for positioning the group of six head units 17*a* to 17*f* for reading and writing information on the respective disc recording surfaces and retracting these heads to provide clearance for removal and insertion of the interchangeable disc stack 14.

Each of the head units 17*a* to 17*f* includes a group of 12 read/write heads for a respective one of the six record surfaces of the disc stack 14 and a common head mount provides nearly equal and fixed lateral spacing of the 12 read/write heads to cooperate with the respective record surfaces for reading and writing on spaced tracks. The head mounts for the respective head unit are supported in vertical alignment by the head assembly 18 for common radial movement to sixteen different positions over the respective record surfaces by movement of a rod 29 from an incremental positioner 19 to the multiple head assembly 18. Thus the set of six head units 17*a* and 17*f* are commonly positioned to provide access by each read/write head to a respective set of 16 information tracks. The group of 12 read/write heads for a single disc surface, e.g., head unit 17*a*, is capable of providing individual access to a total of 12×16 or 192 closely spaced information tracks on the upper surface of record disc 14*a*. The rotation of the disc stack 14 in the direction shown by rotation arrow 25 revolves the information tracks, for example track 22, and cyclically rotates a discrete recording surface area 20 on record disc 14*a*, past head unit 17*a*. Signals read from the record surface by the read-heads of head unit 17*a* are routed by a cable 24 to a switch module 26 which provides for selecting with a switch 28 signals from a particular read-head 17' to be visually monitored on a connecting oscilloscope 27.

Figure 2:
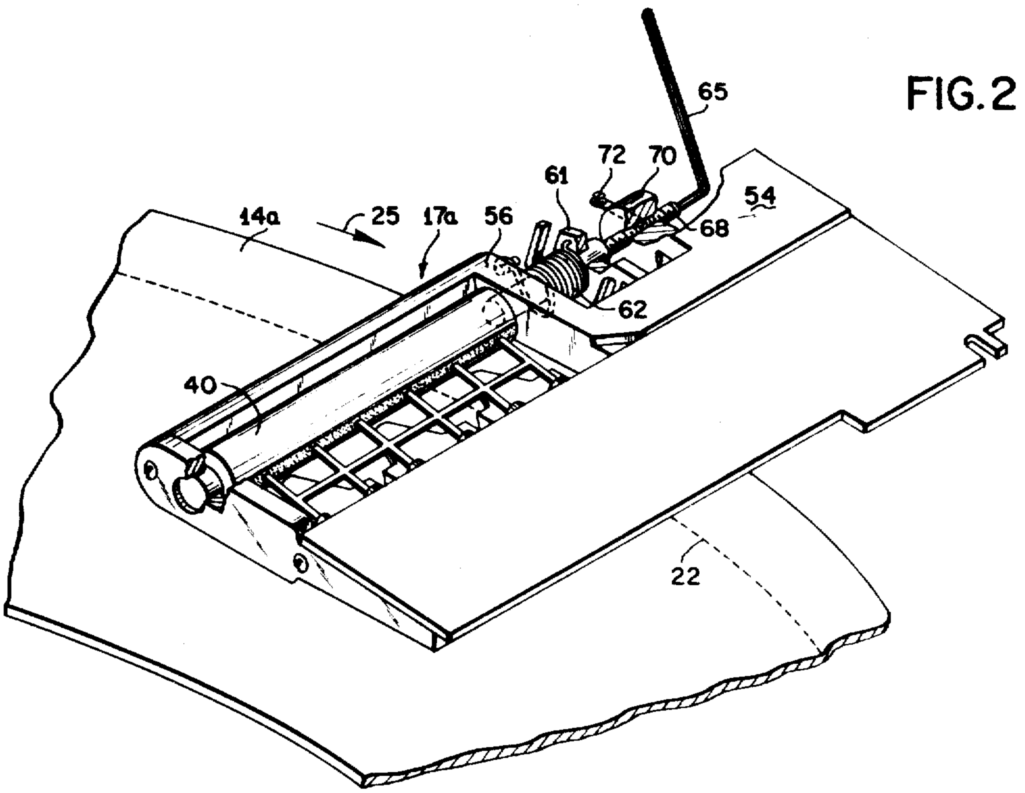
FIG. 2 is a detailed view of the multiple head unit shown in FIG. 1 illustrating the means for adjusting the radial position of the read/write heads relative to a record disc.

The multiple head unit 17*a*, more particularly shown in FIG. 2, has 12 transducer heads (not shown) adjacent to the record disc 14*a* and fixed to a supporting rod 40 in an assembly bracket 54. The supporting rod 40 is reduced in cross section and extended through a crossmember 56 of the assembly bracket 54. A lever member 61 is locked to the end of the supporting rod 40 and a compression coil spring 62 is wrapped around the supporting rod and anchored at one end to the crossmember 56 and at the other end to the lever member 61. The coil spring 62 is compressed between crossmember 56 and lever member 61 so as to urge the supporting rod 40 against an adjusting screw 68, which is threadably engaged with an ear portion 70 of the assembly bracket 54. Turning the adjusting screw 68, with an adjusting tool 65, relative to the ear portion 70 of the assembly bracket 54 provides lateral shifting of the supporting rod 40 and thus provides for finely positioning the transducer heads fixed to the supporting rod 40 in a direction transverse to track 22 on record disc 14*a*. When the proper adjustment is made it is desirable to lock the adjusting screw 68 to the ear portion 70 as by a locking pin 72.

The record discs 14*a*, 14*b*, 14*c* in FIG. 1 are comprised of a magnetic recording surface of a thin film of cobalt plated on a nonmagnetic substrate. A calibration pattern, included in surface area 20 and illustrated in FIG. 3, is formed on each disc surface of the disc stack 14. FIG. 3*a* is an enlarged sectional view of the record disc shown in FIG. 3, taken along the lines *3a–3aa*, to show a typical aperture of the illustrated calibration pattern formed by etching away the cobalt recording medium 43 to expose a surface 46 of the nonmagnetic substrate 45. In order to align the read/write heads in the disc file 10, it is highly desirable to accurately control the relative sizes of the apertures and their position with respect to an arc through the extremely small calibration pattern. The dimensional accuracies required to establish a precise radial position for the read/write heads is obtained by first drawing an enlarged size of the desired pattern on stable drafting film which is then photoreduced to the proper size. A positive image mask of the reduced pattern is accurately positioned over a photoresist film, such as KTFR available from the Eastman Kodak Company, spread on the disc surface, and then the film and the mask are exposed to an ultraviolet light. The exposed areas of the film harden and the unexposed areas, remaining relatively soft, are washed out leaving the desired pattern mask adhering to the disc surface. The precisely positioned and dimensionally accurate calibration pattern shown in FIG. 3 is then formed by etching away the uncovered magnetic material to expose the nonmagnetic substrate.

Referring now to FIGS. 3 and 4, the calibration pattern is comprised of similar track patterns positioned on spaced radial tracks, corresponding to the spaced read/write heads in the head unit 17*a* shown in FIGS. 1 and 2. Aperture sets A, B, C, D and E of the single calibration track pattern shown in FIG. 4, each include an aligning aperture 32 and an inner and outer boundary aperture 31 and 33, which are located, respectively, at a shorter and longer radial distance on the record disc 14*a* with respect to an aligning aperture 32. Although the aligning apertures 32 of the calibration pattern in FIG. 4 appears to be located in a straight line, it should be understood that in order to achieve the desired accurate radial positioning of a head unit, the aligning apertures 32 have been centrally located on a curved centerline which is a small arc of a circle coincident with illustrated track 22*b*. Those edges of boundary apertures 31 and 33 shown parallel to track 22*b* are in line with corresponding inner and outer edges of the aligning aperture 32. Apertures 31 and 33 are of sufficient width so that the total width of the three apertures 31, 32 and 33 is greater than the adjustable span of the head unit 17*a*. The width of aligning apertures 32 are consecutively decreased in each adjacent set in order, with set A having the widest aperture 32 and set E having the narrowest aperture 32, which is the width of a read-head. The plurality of consecutively sized aperture rows in the calibration pattern provides for measuring the amount of displacement of the read-head with respect to the calibration pattern by producing signals from the read-head denoting which apertures, or parts thereof, pass beneath the read-head. Furthermore, it facilitates the adjustment of the read-head by enabling a relatively course adjustment to be made first with respect to the apertures in set A, and then consecutively finer adjustments are made with respect to each of the successive sets B, C, D and E. The arc length of aligning aperture 32 is approximately twice the arc length of boundary apertures 31 and 33 and the correspondingly longer time required by an aligning aperture 32 to pass beneath a read-head serves to easily distinguish the signals produced by the aligning apertures 32 from those produced by the boundary apertures 31 and 33, as seen in FIGS. 5 and 6.

Referring to the disc file shown in FIG. 1, the calibration pattern in FIG. 4 and the signal waveshapes in FIG. 5, the adjustment procedure for accurately positioning the read/write head on head unit 17*a* with respect to the calibration pattern will now be described. Initially, an alternating magnetic pattern is written on the surface of record disc 14*a* by pulsating signals from a write-head of head unit 17*a*, it being understood that a write-head signal produces signals on a considerably wider track than that read by a read-head. With the record disc 14*a* rotating in the direction shown by arrow 25, the apertures of sets A, B, C, D and E, in that order, will pass beneath the read-head of head unit 17*a* and the signal waveshapes shown in FIG. 5 are displayed on the oscilloscope 27. The signals read by the read-head traveling along track 22*a*, with the radial distance to the read-head shorter than the radial distance to the center of an aligning aperture 32, will be considered first. The null signal produced as the read-head passes over aligning aperture 32 of set A, which has an aligning aperture 32 wider than the aligning apertures of the subsequent sets, indicates that the read-head passed directly over aperture 32. The consistently high signal amplitude during the time periods for aperture 31 and 33 of set A indicate that the read-head did not pass over these apertures. The read-head continues on to set B where a slight decrease in signal amplitude is evident as the read-head passes over a small portion of aperture 31 and, noting that aperture 32 of row B is slightly narrower than aperture 32 of the prior row A, the small amplitude signals shown during the time for aperture 32 indicates that the read-head extended over an edge of aperture 32. The full amplitude signal shown as the read-head passed by aperture 33 indicates that the read-head did not pass over any part of aperture 33. Referring to FIG. 4, it is readily seen that the read-head, passing through apertures 31 and 32 of row B, is positioned on track 22*a* which is on the inward side of the calibration pattern. As the read-head continues over sets C, D and E, the signals produced as the read-head passes consecutive aligning apertures 32 are of increasing amplitude and the signals produced as the read-head passes consecutive inner boundary apertures 31 are of decreasing amplitude, which indicates that the read-head is passing over decreased segments of apertures 32 and increasing segments of aperture 31 of the consecutive sets of apertures. In order to accurately position the read-head over the calibration pattern, the adjusting tool 65 is rotated to move the read-head on head unit 17*a* directly over the aligning apertures 32 of sets A, B, C, D and E, in that order, onto track 22*b*. Referring to the signal waveshapes displayed for track 22*b* in FIG. 5, it is seen that a signal null is displayed as each aligning aperture 32 passes the read-head, in the manner previously described for the read-head in track 22*a* passing over set A, which indicate that the read-head is passing directly over the aligning aperture 32 of each set A, B, C, D and E.

The signals displayed when the read-head travels past the calibration pattern of FIG. 2 and along track 22*c* are also shown in FIG. 5. As the read-head travels along track 22*c*, the signals produced as the read-head passes apertures 32 are of an increasing amplitude and those produced as the read-head passes apertures 33 are of a decreasing amplitude for sets A, B, C, D and E, respectively. In accordance with the prior description, these signals indicate that the read-head is passing over apertures 32 and 33 which is on the outward side of the calibration, i.e., track 22*c*. The read-head on head unit 17*a* is positioned over the aligning apertures 32 and onto track 22*b* by rotating the adjusting tool 65 to obtain the corresponding signal waveshapes shown in FIG. 5.

Having positioned a single read-head on head unit 17*a* directly over the aligning apertures 32 of track 22, the remaining 11 heads on head unit 17*a* have also been positioned relative to their respective calibration tracks. Any displacements existing between these 11 read-heads and their respective calibration tracks are readily measured by connecting, in turn, each of the read-heads through switch module 26 to the oscilloscope 27 and viewing the signals read by each head from the rotating record disc 14*a*. In accordance with the prior description, the signals displayed as alignment apertures 32 pass the read-head indicates the amount of displacement and the signals displayed as inner and outer boundary apertures 31 and 33 pass the read-head indicates either an inner or outer direction of displacement. In this manner the amount and direction of any displacement existing between each of the read-heads commonly mounted on the supporting rod 40 shown in FIG. 2 and their respective calibration tracks is ascertained. An optimized adjustment which reduces the maximum displacement between the read/write heads and their respective calibration track patterns may readily be obtained for the head-unit 17*a* by rotating the adjusting tool 65 to move the supporting rod 40 and the read/write heads fixed thereto. The displacement between each of the read-heads and its respective calibration track is then ascertained again by repeating the above-described procedure until an optimized adjustment for the commonly mounted read/write heads is obtained.

The waveshapes shown in FIG. 6 may be obtained in the above-described adjustment procedure as an alternative to those waveshapes shown in FIG. 5. The waveshapes shown in FIG. 6 are obtained by initially passing a bar magnet over the surface of the record disc in the area of the calibration pattern to magnetize the record disc in a single direction instead of initially writing an alternating magnetic pattern on the record disc surface. The read-head senses the change of flux when passing from a magnetized area to an aperture exposing a nonmagnetic surface, or when passing from a nonmagnetic aperture to a magnetized area, and corresponding signal pulses are produced in the read-head and displayed on the connected oscilloscope 27. The amplitude of the signal pulses seen on the oscilloscope 27 are determined by the magnitude of the change of flux beneath the read-head, which is determined by the width of the aperture passing directly beneath the read-head, i.e., the radial position of the read-head with respect to the aperture. Accordingly, it should be noted that the waveshapes shown in FIG. 6 for the read-head positioned on tracks 22*a*, 22*b* and 22*c* correspond to the waveshapes shown in FIG. 5 for the respective tracks. For example, as the read-head positioned on track 22*a* passes through set A, it misses aperture 31 thus producing no signal, enters into the nonmagnetic area of aperture 32 producing the signal pulse 32*a*1 and the leaves aperture 32 to the surrounding magnetic recording surface producing pulse 32*a*2. Continuing on to set B the read-head passes over a small portion of aperture 31 and slightly off of aperture 32 thereby producing signals 31*b*1, 31*b*2 and 32*b*1 and 32*b*2, respectively, as the read-head enters and exits each aperture. Continuing on to sets C, D and E, it is seen that the signals associated with apertures 32 are of consecutively decreasing amplitudes whereas those associated with aperture 31 are of corresponding increasing amplitudes indicating that the read-head is passing over increasingly larger segments of boundary aperture 31 and decreasingly smaller segments aligning aperture 32 as previously described for track 22*a*. In the signal waveshapes displayed for track 22*b*, it is seen that the pulses are of the same amplitude and occur only as the read-head enters and exits each aligning aperture 32 indicating that the read-head is passing within the aligning aperture 32 of each set. With the read-head positioned in track 22*c* and passing over sets A, B, C, D and E, the signals associated with apertures 32 are of a decreasing amplitude and those signals associated with apertures 33 are of an increasing amplitude which indicates that the read-head is passing over apertures 32 and 33 on the outward side of the calibration pattern.

From the above description, it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

What we claim is:

1. Apparatus for use in a disc file of a magnetic disc memory system to align, relative to an axial spindle, the position of a head unit having a read-head capable of performing transducing operations on a magnetic recording surface, comprising: a rotatable record disc interchangeably mounted on the spindle of the disc file and having a magnetic recording surface on a nonmagnetic substrate; and a calibration track pattern accurately positioned on said rotatable record disc and formed by providing nonmagnetic areas on the magnetic recording surface, the pattern being disposed on the record disc to provide signals from the read-head of the head unit which signals are indicative of the position of the read-head relative to the calibration pattern rotating with the record disc about the spindle; and wherein said calibration track pattern includes an aperture set having an aligning aperture and a boundary aperture of significantly different arc lengths on the record disc which produce signals from the read-head that are easily distinguished one from another by the time duration of the signals as the record disc rotates past the head unit about the spindle.

2. The invention in accordance with claim 1 wherein said calibration track pattern includes a plurality of aperture sets, the aligning apertures of different sets having different widths which provide for measuring the amount of displacement of the read-head relative to the calibration pattern rotating past the head unit.

3. The invention in accordance with claim 1 wherein said calibration track pattern includes a set of apertures having an aligning aperture and an inner and an outer boundary aperture adjacent to the aligning aperture and located at a shorter and longer radial distance, respectively, relative to the aligning aperture of the record disc.

4. The invention in accordance with claim 3 wherein the aligning aperture and the boundary apertures are of different arc lengths on the record disc and produce signals from the read-head that are easily distinguished by the time duration of the signals as the record disc rotates past the head unit about the spindle.

5. Apparatus for use in a disc file to align, relative to an axial spindle, the position of a head unit having a read-head capable of performing transducing operations on a magnetic recording surface, comprising: a rotatable record disc interchangeably mounted on the spindle of the disc file and having a magnetic recording surface on a nonmagnetic substrate; an aligning aperture on said record disc formed by an aperture in the magnetic recording surface exposing an area of the nonmagnetic substrate; and an inner and an outer boundary aperture adjacent to the aligning aperture located at a shorter and longer radial distance, respectively, relative to the aligning aperture on the record disc, the aligning and boundary apertures forming a pattern disposed on the record disc to provide signals from the read-head of the multiple head unit which signals are indicative of the position of the read-head relative to the calibration pattern rotating with the record disc about the axial spindle.

6. The invention in accordance with claim 5 wherein said aligning aperture and said boundary apertures are of significantly different arc lengths on the record disc and produce signals from the read-head that are easily distinguished one from another by the time duration of the signals as the record disc rotates past the head unit about the spindle.

7. The invention in accordance with claim 5 wherein a plurality of aligning apertures are provided on an arc of the record disc, each aligning aperture having an inner and outer boundary aperture located adjacent to it, and said aligning apertures being of various widths to provide for measuring the amount of displacement of the multiple head unit relative to the arc common to the rotating aligning apertures.

8. The invention in accordance with claim 5 wherein said rotatable record disc has a magnetic recording surface of a thin film of cobalt plated on the nonmagnetic substrate, and said calibration pattern is formed by etching selected areas of the cobalt film to expose a surface of the nonmagnetic substrate.

9. Apparatus for use in a disc file of a magnetic disc memory system to align, relative to an axial spindle, the position of a multiple head unit having a plurality of read-heads capable of performing transducing operations on a magnetic recording surface, comprising: a rotatable record disc interchangeably mounted on the spindle of the disc file and having a magnetic recording surface on a nonmagnetic substrate; and a plurality of calibration track patterns formed by apertures in the magnetic recording surface exposing areas of the nonmagnetic substrate, and individual calibration track pattern accurately positioned on said rotatable record disc for different read-heads of the multiple head unit, each of said calibration patterns being disposed on the record disc to provide signals from a corresponding read-head of the multiple head unit which signals are indicative of the read-head position relative to the calibration track pattern rotating with the record disc about the spindle; wherein each of said calibration track patterns includes an aperture set having an aligning aperture and a boundary aperture of significantly different arc lengths on the record disc which produce signals distinguishable by their time duration from their respective read-heads as the record disc rotates past the head unit about the spindle.

10. The invention in accordance with claim 9 wherein each of said calibration track patterns includes a plurality of aperture sets, the aligning aperture of different sets having different widths which provide for measuring the amount of displacement of the read-head relative to its calibration track pattern rotating with the record disc about the spindle.

11. The invention in accordance with claim 9 wherein each of said calibration track patterns includes a set of apertures having an aligning aperture and an inner and outer boundary aperture located at a corresponding shorter and longer radial distance relative to the aligning aperture on the record disc.

12. The invention in accordance with claim 11 wherein the alignment aperture and the inner and outer boundary apertures are sequentially rotated past the read-head to produce signals indicative of the direction of displacement of the read-head relative to the aligning aperture of the track pattern.

13. The invention in accordance with claim 11 wherein the aligning aperture and the boundary apertures are of significantly different arc lengths on the record disc and produce signals that are easily distinguished by the time duration of the signals as the record disc rotates past the head unit.